United States Patent
Ronneburg et al.

(10) Patent No.: US 6,859,830 B1
(45) Date of Patent: Feb. 22, 2005

(54) METHOD AND SYSTEM FOR DETECTING A DEAD SERVER

(75) Inventors: Frank Ronneburg, Sammamish, WA (US); Erik Mavrinac, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 09/602,940

(22) Filed: Jun. 23, 2000

(51) Int. Cl.$^7$ .............................. G06F 15/173
(52) U.S. Cl. ................. 709/224; 709/223; 709/225; 709/226
(58) Field of Search ................ 709/223–226; 707/202

(56) References Cited

U.S. PATENT DOCUMENTS

| | | | | |
|---|---|---|---|---|
| 5,696,895 A | * | 12/1997 | Hemphill et al. | 714/4 |
| 5,774,660 A | * | 6/1998 | Brendel et al. | 709/201 |
| 5,781,716 A | * | 7/1998 | Hemphill et al. | 714/4 |
| 6,108,703 A | * | 8/2000 | Leighton et al. | 709/226 |
| 6,249,801 B1 | * | 6/2001 | Zisapel et al. | 718/105 |
| 6,370,656 B1 | * | 4/2002 | Olarig et al. | 714/23 |
| 6,370,657 B1 | * | 4/2002 | Jansen et al. | 714/23 |
| 6,553,413 B1 | * | 4/2003 | Leighton et al. | 709/219 |

* cited by examiner

Primary Examiner—Ario Etienne
Assistant Examiner—LaShonda Jacobs
(74) Attorney, Agent, or Firm—Merchant & Gould

(57) ABSTRACT

Method and system for detecting a dead server in a multi-server environment. A virtual ring structure is used in which each server in a server pool is only required to monitor the status of two other servers in the server pool. Thus, a server need only transmit ping signals to two other servers (its buddies) in the server pool at any given time. Because each server maintains the status of only two other servers at any given time, the size of the server pool is not limited by the ability of each server to send and process ping signals. The two servers which are monitored by any given server in the server pool are referred to as the "buddy A" server and the "buddy B" server. When the monitoring server determines that one of its buddy servers is down, the monitoring server reports the status of the down server to a SQL server that maintains a server table. The server table maintains a list of each "live" server and the buddy servers assigned to that server. Down servers are removed from the server table. When a server determines that one of its buddies is down, the report to the SQL server results in a buddy reassignment. The buddies of the down server are made buddies of one another and the virtual server ring is once more intact. The SQL server then knows not to route any client to the down server.

6 Claims, 5 Drawing Sheets

METHOD AND SYSTEM FOR DETECTING A DEAD SERVER

TECHNICAL FIELD

This invention relates to multi-server network management. More particularly, this invention relates to a method and system for detecting a dead server within a server pool and routing clients to an operative server within the server pool.

BACKGROUND OF THE INVENTION

It is imperative for the efficient operation of a multi-server network that the status of each server be known. If, for example, a server is down, i.e. dead, then clients attempting to log into the server should be routed away from the dead server to another server within a server pool. Thus, there must be some means for maintaining the status of each server in the server pool.

One approach to maintaining the status of any given server within a server pool has been to transmit and monitor "ping" signals communicated between servers. In this conventional approach, each server in the server pool would send a ping signal to all other servers within the pool and wait for a responsive ping signal. If a responsive ping signal was not received from a particular server, the ping sending server could make a determination that the unresponsive server was dead. Under this approach, each server in the pool can monitor and maintain the status of all other servers in the pool. When a monitoring server in the server pool determines that another server is dead, the monitoring server can report the status of the dead server to a centralized location, such as a SQL server. Thus, when a client attempts to access a server in the pool, the SQL server will prevent the client from being connected to a dead server and will route the client to an operative server.

Another approach to maintaining the status of any given server within a server pool has been to transmit and monitor "ping" signals communicated from a centralized location. In this approach, one centralized server in the server pool would send a ping signal to all other servers within the pool and wait for a responsive ping signal.

While the approaches described above are fairly effective, they consume a good deal of system resources and have very limited extensibility. Whether ping signals are communicated from a single server or from each server, the capacity for generating and processing ping signals becomes limited as the number of servers in the pool increases. In other words, the size of the server pool becomes limited by the capacity to generate and process ping signals, especially when processing is accomplished through only a single server. Moreover, the multiple ping signals consume a lot of the bandwidth of a network as the number of servers in the server pool increases.

Therefore, there is a need in the art for a method and system for maintaining the status of servers within a server pool that is infinitely extensible without consuming a large amount of system resources. There is also, a need for such a method and system that is able to be implemented within existing server pool models.

SUMMARY OF THE INVENTION

The present invention satisfies the above described needs by providing a method and system for detecting a dead server in a server pool. In one aspect, the present invention provides an infinitely extensible means for maintaining the status of servers within a server pool. The invention utilizes the conventional ping signals method for determining the status of a server. That is, each server can send a ping signal to other servers within the server pool and determine the status of a server based on the receipt or absence of a responsive ping signal.

The present invention simplifies the conventional approach described above by utilizing a virtual ring structure. In the virtual ring structure, each server is only required to monitor the status of two other servers in the server pool. Thus, a server need only transmit ping signals to two other servers (its buddies) in the server pool at any given time. Because each server maintains the status of only two other servers at any given time, the size of the server pool is not limited by the ability of each server to send and process ping signals.

For the purposes of discussion, the two servers which are monitored by any given server in the server pool are referred to as the "buddy A" server and the "buddy B" server. Collectively, they are the "buddies" of the monitoring server. When the monitoring server determines that one of its buddy servers is down, the monitoring server reports the status of the down server to a SQL server that maintains a server table. The server table maintains a list of each "live" server and the buddy servers assigned to that server. Down servers are removed from the server table, and thus, the server pool, by use of the server table within the SQL server. When a server determines that one of its buddies is down, the report to the SQL server results in a buddy reassignment. The buddies of the down server are made buddies of one another and the virtual server ring is reestablished. The SQL server then knows not to route any client to the down server.

When a server is to be added to the server pool, another buddy reassignment is required. In such a case, a server and its buddy will be reassigned the added server as a buddy. Thus, the added server will have the original server and the buddy server as its buddies.

If a server is to be shutdown normally, that server is responsible for removing itself from the server table. This is done by having the retiring server initiate the buddy reassignment procedure described above in connection with the down server scenario.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
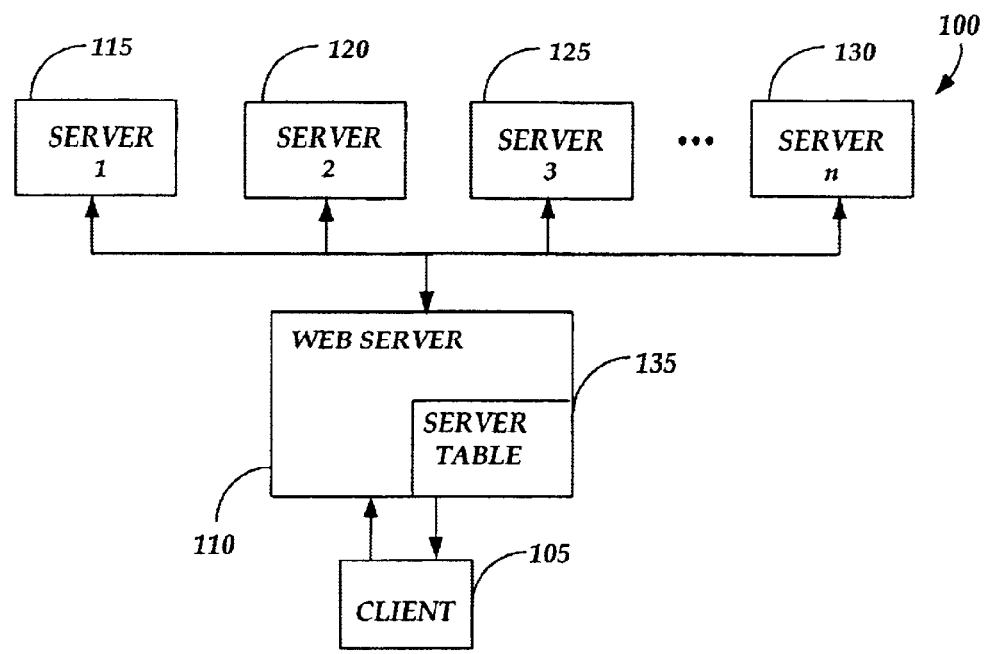
FIG. 1 is a block diagram of an exemplary operating environment for the present invention.

The present invention provides an infinitely extensible means for maintaining the status of servers within a server pool. The invention utilizes the conventional ping signals method for determining the status of a server. That is, each server can send a ping signal to other servers within the server pool and determine the status of a server based on the receipt or absence of a responsive ping signal.

The present invention simplifies the conventional approaches described above by utilizing a virtual ring structure. In the virtual ring structure, each server is only required to maintain the status of two other servers in the server pool. Thus, a server need only transmit ping signals to two other servers (its buddies) in the server pool at any given time. Because each server monitors the status of only two other servers at any given time, the size of the server pool is not limited by the ability of each server to send and process ping signals.

For the purposes of discussion, the two servers which are monitored by any given server in the server pool are referred to as the "buddy A" server and the "buddy B" server. Collectively, they are the "buddies" of the monitoring server. When the monitoring server determines that one of its buddy servers is down, the monitoring server reports the status of the down server to a SQL server that maintains a server table. Those skilled in the art should appreciate that the SQL server table acts as a data repository for the set of servers in the pool.

The server table maintains a list of each "live" server and the buddy servers assigned to that server. Down servers are removed from the server table, and thus, the server pool, by use of the server table within the SQL server. When a server determines that one of its buddies is down, the report to the SQL server results in a buddy reassignment. In one embodiment of the present invention, a load balancing coordination software module is included on the SQL server and performs the actual decision making process based on the information contained on the server table. The load balancing coordination software module comprises a set of stored procedures, which are logically separate from the server table.

Those skilled in the art should appreciate that in alternate embodiments of the present invention, the decision making process may be performed at a Web server(s), dedicated hardware router, or any other suitable proxy device. It should also be understood that the present invention may use alternative methods of routing a client request to an appropriate server in a server pool structure.

The buddies of the down server are made buddies of one another and the virtual server ring is once more intact. The SQL server then knows not to route any client to the down server.

When a server is to be added to the server pool, another buddy reassignment is required. In such a case, a server and its buddy will be reassigned the added server as a buddy. Thus, the added server will have the original server and the buddy server as its buddies.

If a server is to be shutdown normally, that server is responsible for removing itself from the server table. This is done by having the retiring server initiate the buddy reassignment procedure described above in connection with the down server scenario.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

With reference to FIG. 1, a block diagram of an exemplary system 100 for implementing the invention is illustrated. The system 100 comprises a client 105 attempting to connect to one of a pool of servers managed by Web server 110. The server pool comprises servers 115, 120, 125, and 130. The status of each of the servers in the server pool is maintained in a server table 135. In a preferred embodiment, Web server 110 is a SQL server and server table 135 is a SQL server database. However, it should be understood that the management of the server pool is not limited to a Web server or SQL server and may be maintained by any suitable proxy device capable of maintaining knowledge of the status of the server pool and capable of redirecting the client 105 to a functioning server.

Servers 115, 120, 125, and 130 are in a server pool and are functionally equivalent to one another. Thus, when a client requests connection, such as by sending an URL address to the Web server 110, the Web server determines an available server in the server pool to connect the client to. The Web server maintains the status of the servers in the server table and is able to redirect the client to an operative server in the server pool.

It should be understood that the logical connections between the client and the Web server 110 depicted in FIG. 1 may comprise a local area network (LAN) or a wide area network (WAN). Such networking environments are commonplace in offices, enterprise-wide computer networks, intranets and the Internet. However, it will be appreciated that the network connections shown are exemplary and other means of establishing a communications link between the client and Web server may be used.

Figure 2:
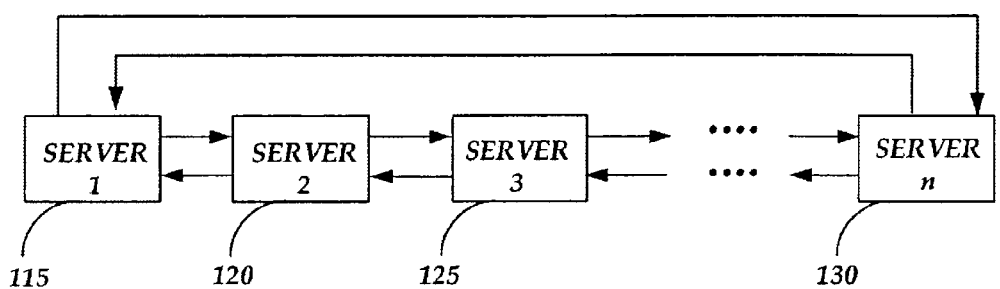
FIG. 2 is an illustration of a virtual server ring in accordance with an embodiment of the present invention.

The present invention provides a unique way to maintain and update the server table by placing the servers in a virtual server ring as illustrated in FIG. 2. Each server is assigned two buddies and is responsible for periodically "pinging" each of its two buddies to ensure that one of its buddies is not down, or dead. In one embodiment, each server sends its buddies an ICMP ping and waits for a reply from its buddies. If a buddy server does not send back a reply after a predetermined number of pings, then the monitoring server (the server sending the ping) will determine that one of its buddies is down, i.e., dead.

When the monitoring server determines that one of its buddy servers is down, the monitoring server reports the status of the down server to the Web server. The Web server then knows not to route any client to the down server. However, the monitoring server no longer has an operative buddy server and is, itself, no longer being monitored by that down buddy server.

Down servers are removed from the server pool by use of the server table within the Web server. The server table maintains a list of each server and the buddy servers assigned to that server. It should be understood that each server maintains a simple list of its two buddies (referred to herein as the "buddy list"). However, the more complex list of all active servers and their buddies is maintained at the server table.

When a server determines that one of its buddies is down, the report to the Web server results in a buddy reassignment. The buddies of the down server are made buddies of one another and the virtual server ring is once more intact.

When a server is to be added to the server pool, another buddy reassignment is required. In such a case, a server and its buddy will be reassigned the added server as a buddy.

Thus, the added server will have the original server and the buddy server as its buddies.

If a server is to be shutdown normally, that server is responsible for moving itself from the server pool's entry in the server table. This is done by having the retiring server initiate the buddy reassignment procedure described above in connection with the down server scenario.

Having described an exemplary operating environment for the invention, a flowchart illustrating a method 300 for adding a new server to the virtual server ring in accordance with an embodiment of the present invention will be described in reference to FIG. 3.

Adding a New Server to the Virtual Server Ring

Figure 3:
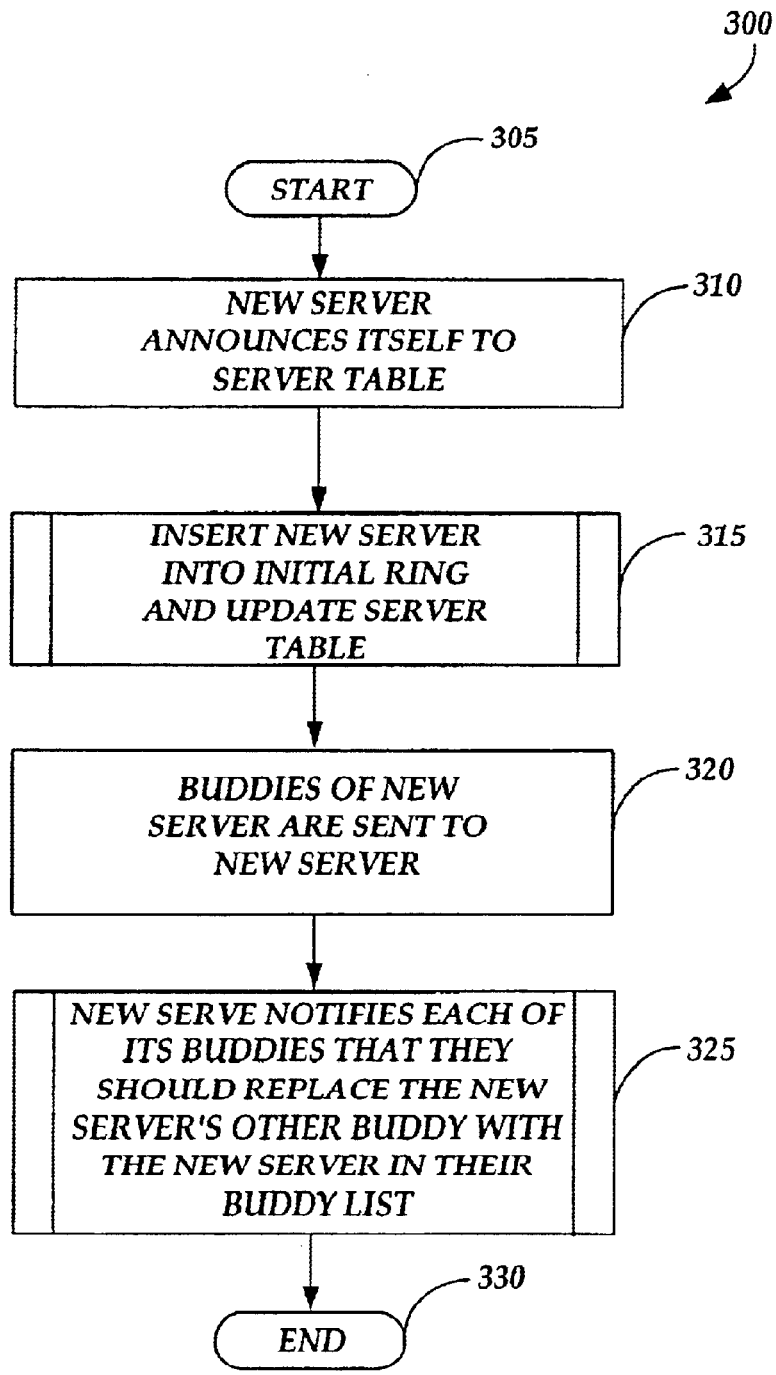
FIG. 3 is a flowchart illustrating a method for adding a new server to the virtual server ring in accordance with an embodiment of the present invention.

FIG. 3 is a flowchart illustrating a method 300 for adding a new server to the virtual server ring in accordance with an embodiment of the present invention. The method 300 begins at start step 305 and proceeds to step 310 when a new server announces itself to the server table 135. Typically, on server start-up, the new server announces itself to the server table using an ADO ("Active Data Objects") call to ServerAnnounce, passing the new server's IP address as an argument. ADO is a programming interface that is designed by the Microsoft Corporation of Redmond, Washington as a standard for data access, which allows a client to interact with a SQL server, such as the Web server 110. In the preferred embodiment of the present invention, the ServerAnnounce stored procedure is stored on the Web server 110. The method then proceeds to step 315.

At step 315, the ServerAnnounce procedure inserts the new server into the virtual ring and updates the server table. The method then proceeds to step 320.

At step 320, the buddies of the new server are returned to the new server by the return mechanism of the call to the ServerAnnounce procedure. At this point, the new server becomes responsible for looking after these buddies, but these buddies don't yet know about the new server. So, at step 325, the new server sends a message to each of its new buddies indicating that they should replace the new server's other buddy with the new server in their list of servers to keep track of (the server's buddy list). It should be understood that buddy list refers to a list maintained by each server comprising Buddy A and Buddy B for the server.

In a preferred embodiment, each server in the virtual server ring implements a dedicated listener thread that listens on a specific port for messages like this from the other servers. Essentially, this may be seen as exposing a "ServerReplace" function, in which the receiving server is told to replace a given buddy server with another.

The method then ends at step 330.

Updating the Server Table

Figure 4:
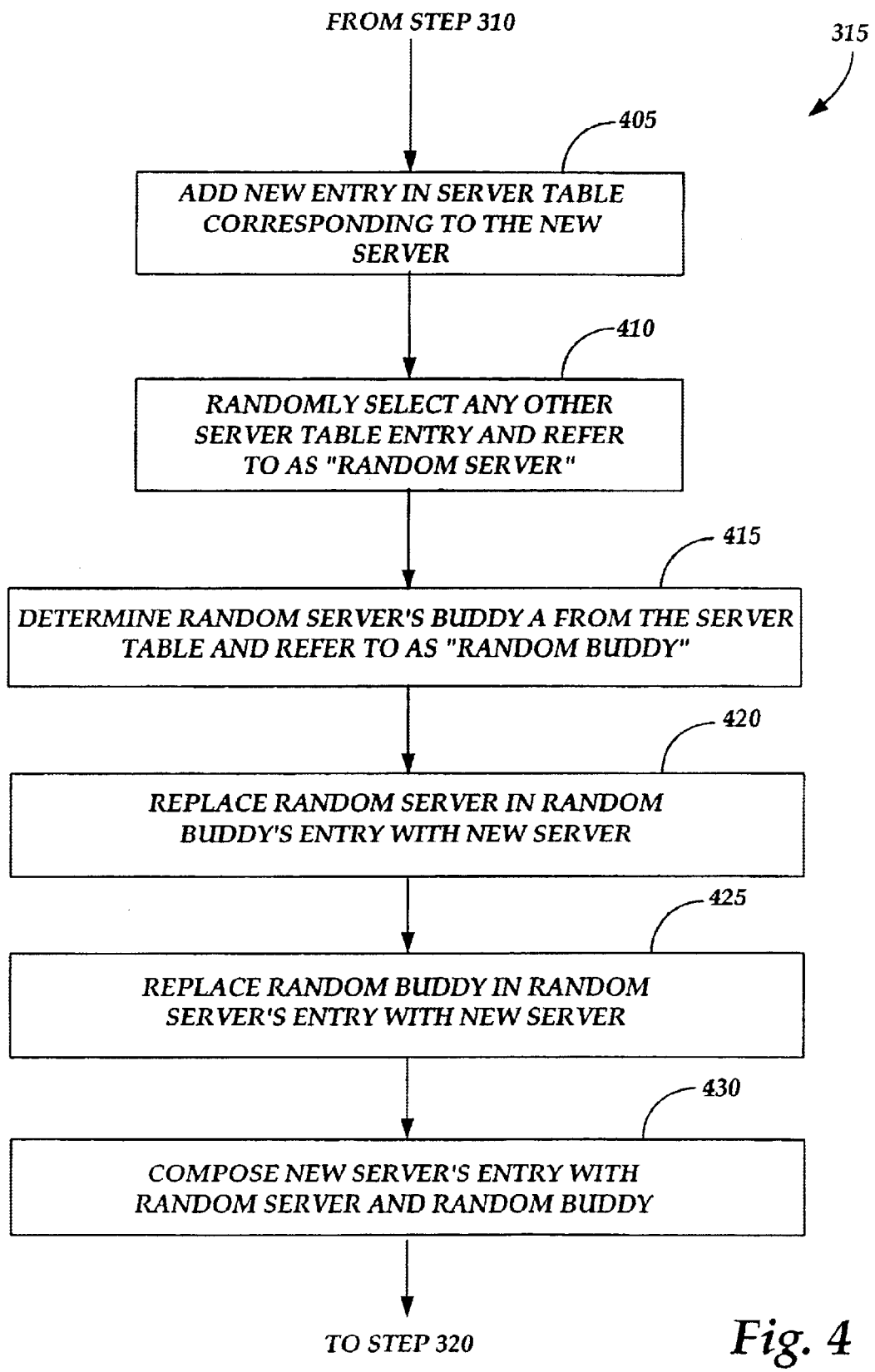
FIG. 4 is a flowchart illustrating a method for updating the server table (step 315 of FIG. 3) in accordance with an embodiment of the present invention.

Referring now to FIG. 4, a flowchart illustrating a method for updating the server table (step 315 of FIG. 3) in accordance with an embodiment of the present invention will be described.

At step 405, the new server is added as a new entry in the server table (referred to as "NewServer"). The method then proceeds to step 410.

At step 410, any other server table entry is selected and referred to as "RandomServer". The method then proceeds to step 415.

At step 415, determine "RandomServer's" Buddy A from the server table (refer to RandomServer's Buddy A as "RandomBuddy"). The method then proceeds to step 420.

At step 420, "RandomBuddy" should have "RandomServer" in its entry, so replace "RandomServer" in "RandomBuddy's" entry with "NewServer". The method then proceeds to step 425.

At step 425, replace "RandomBuddy" in "RandomServer's" entry with "NewServer". The method then proceeds to step 430.

At step 430, compose "NewServer's" entry with "RandomServer"and "RandomBuddy".

It should be understood that the identity of "RandomBuddy" and "RandomServer" are returned to the NewServer so that it is aware that these are the buddies that is supposed to ping regularly.

It is helpful to provide an example in reference to FIG. 4. Suppose NewServer is server 4, RandomServer is server 2 and RandomBuddy is server 3. Prior to adding NewServer, the server table may appear as shown in Table 1:

TABLE 1

| Server ID | Buddy A  | Buddy B  |
|-----------|----------|----------|
| server 1  | server 2 | server 3 |
| server 2  | server 3 | server 1 |
| server 3  | server 1 | server 2 |

After updating the server table according to the method illustrated in FIG. 4, the server table may appear as shown in Table 2:

TABLE 2

| Server ID | Buddy A  | Buddy B  |
|-----------|----------|----------|
| server 1  | server 2 | server 3 |
| server 2  | server 4 | server 1 |
| server 3  | server 1 | server 4 |
| server 4  | server 2 | server 3 |

Updating Buddy Lists

Figure 5:
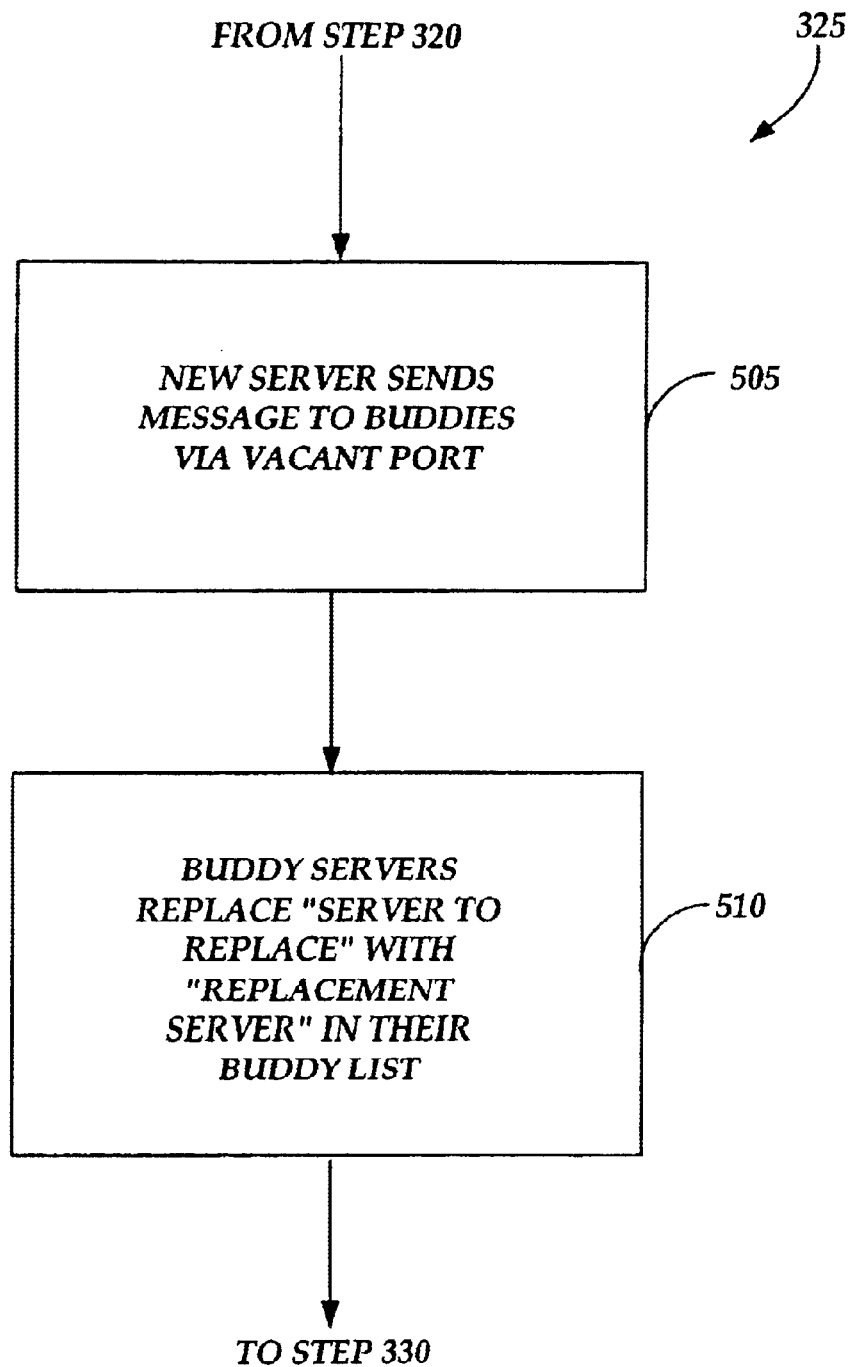
FIG. 5 is a flowchart illustrating a method for updating buddies in a buddy list (step 325 of FIG. 3) in accordance with an embodiment of the present invention.

Referring now to FIG. 5, a flowchart illustrating a method for updating buddies in a buddy list (step 325 of FIG. 3) in accordance with an embodiment of the present invention will be described. It should be understood that each server maintains a simple list of its two buddies (referred to herein as the "buddy list").

As described above with reference to FIG. 3, when a new server is added to the virtual server ring, the buddies of the new server are returned to the new server by the server table. At this point, the new server becomes responsible for looking after these buddies, but these buddies don't yet know about the new server. The new server must now let its new buddies know that it's there, and that they should start pinging it rather than each other. So, at step 325, the new server has to send a message to each of its new buddies indicating that they should replace the new server's other buddy with the new server in its buddy list. In a preferred embodiment, each server in the virtual server ring implements a dedicated listener thread that listens on a specific port for messages like this from the other servers. Essentially, this may be seen as exposing a "ServerReplace"function, in which the receiving server is told to replace a given buddy server with another.

The method illustrated in FIG. 5 is exemplary of how to implement the "ServerReplace" function in accordance with an embodiment of the present invention.

At step 505, the new server sends a message to each of its new buddies via a TCP/IP listen socket on a vacant port of the server. The port is configurable by an administrator who is familiar with which ports of the servers in the server ring are vacant.

The message comprises a "ServertoReplace" argument and a "ReplacementServer" argument. The "ServertoReplace" argument comprises the server to be removed from the buddy list and the "ReplacementServer" argument comprises the new server. Because any new server's buddies were buddies to one another prior to the new server joining the virtual ring, all the information needed to update the buddy list is known. The method then proceeds to step 510.

At step 510, the "ServertoReplace" is replaced with the "ReplacementServer" in the buddy list.

For example, assume the virtual server ring illustrated by the server tables shown in Tables 1 and 2. To update the buddy lists, new server 4 will send a message to server 2 with the arguments (ServertoReplace=3, Replacement Server=4) and then send a message to server 3 with the arguments (ServerToReplace=2, Replacement Server=4). The buddy lists of server 2 and server 3 will then be updated to match the entries in the server table shown in Table 2. It should be emphasized that the server table is the master table maintained by the Web server while the buddy lists are individual lists of buddies maintained by each server.

Removing a Dead Server from the Virtual Server Ring

In normal operation of the virtual server ring, each server regularly pings its two buddies. This is preferably implemented as an ICMP ping, but could be implemented by using a keep-alive at any appropriate hardware or software layer.

If it is found that any given buddy is not responding consistently to the pings, the server that discovers this notifies the server table via a ServerDelete function to update the server table by removing the newly discovered "dead"server. The discovering server now needs to become responsible for the dead server's other buddy, and vice versa, so that the virtual server ring is not broken. This is accomplished by using the ServerDelete function's return values (which identify the "dead" server's two buddies). The discovering server should recognize itself as one of these buddies and calls the other buddy using the "ServerReplace" function (as described above with regard to FIG. 5) indicating that it should replace the "dead" server with the discovering server in its buddy list.

Figure 6:
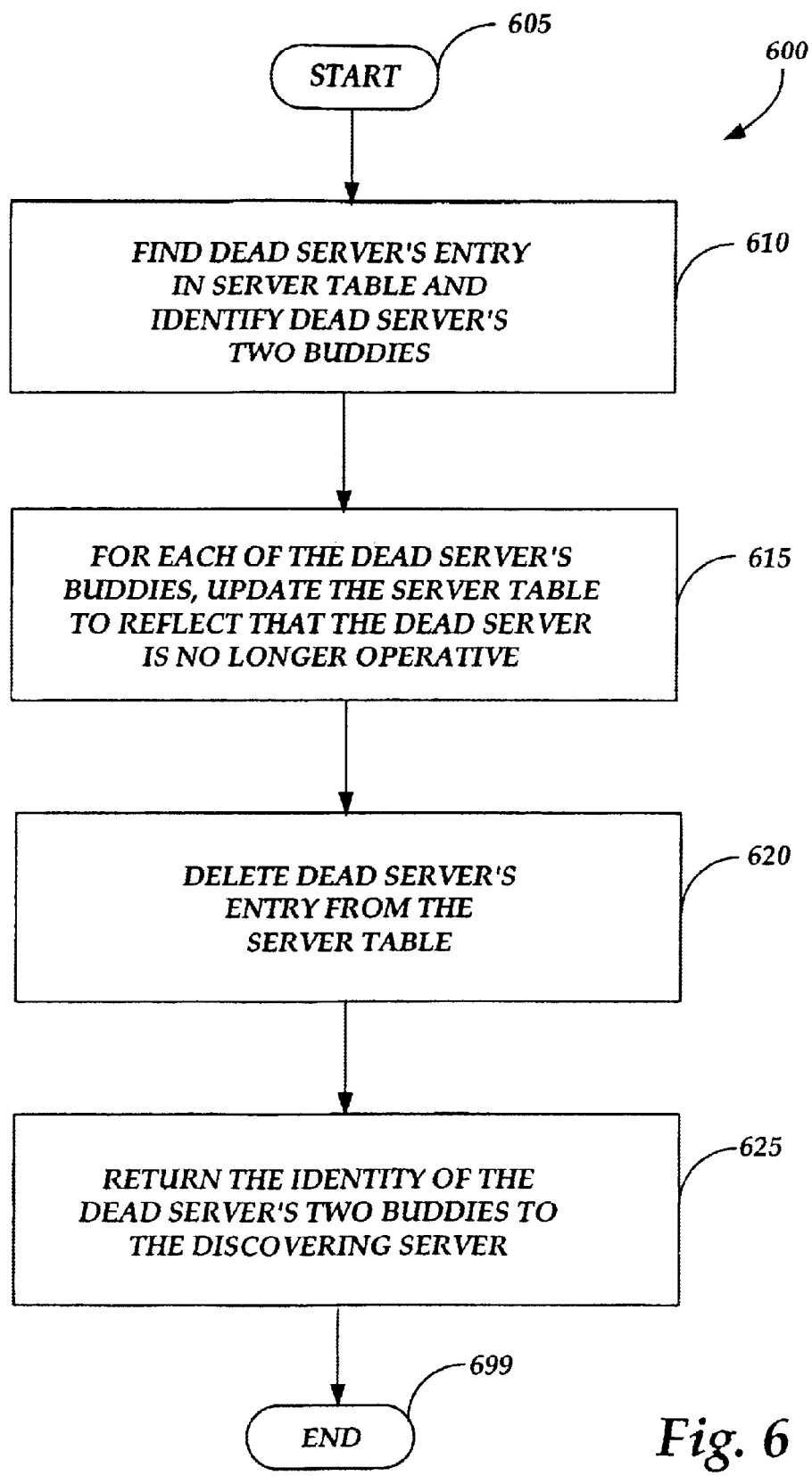
FIG. 6 is a flowchart illustrating a method for removing a dead server from the virtual server ring in accordance with an embodiment of the present invention.

Referring now to FIG. 6, a flowchart illustrating a method 600 for removing a dead server from the virtual server ring in accordance with an embodiment of the present invention will be described. Typically, a server is determined to be "dead" when it has not responded to several ping cycles. The discovering server, i.e. the server that discovers the dead server, needs to remove this dead server from the server table. The discovering server calls a ServerDelete function which is described in reference to FIG. 6.

The method 600 begins at start step 605 and proceeds to step 610 when a dead server has been found. At step 610, an entry for the dead server entry is found in the server table and the dead server's two buddies are identified. The method 600 then proceeds to step 615.

At step 615, for each buddy of the dead server, the buddy's entry is found in the server table, and is updated to reflect that the dead server is no longer operative. For example, if Buddy A and Buddy B are the dead server's buddies, then the server corresponding to the dead server in Buddy A's entry is replaced with Buddy B. Also, the server corresponding to the dead server in Buddy B's entry is replaced with Buddy A. The method then proceeds to step 620.

At step 620, the dead server's entry in the server table is deleted. The method then proceeds to step 625.

At step 625, the identity of the dead server's two buddies is returned to the discovering server. Then, the discovering server must update which servers are pinging each other. The discovering server examines the returned list of two buddies. Of course, one of the buddies will be the discovering server itself. The discovering server may then notify the other buddy of the dead server that the dead server has been removed from the virtual server ring using the ServerReplace function described in reference to FIG. 5. The method then ends at step 699.

An example illustrating method 600 is described below in reference to Tables 3 and 4. Suppose server 3 crashes and is determined to be dead by server 4 such that server 3 needs to be removed from the virtual server ring. Server 4 calls the ServerDelete function on the Web server 110 and indicates that server 3 is dead. Server 3's entry in the server table is found (the server table is illustrated in Table 3).

TABLE 3

| Server ID | Buddy A | Buddy B |
| --- | --- | --- |
| server 1 | server 2 | server 3 |
| server 2 | server 4 | server 1 |
| server 3 | server 1 | server 4 |
| server 4 | server 2 | server 3 |

At step 610, the two buddies of server 3 are identified as server 1 and server 4.

At step 615, the entries for server 1 and server 4 are found in the server table and the server table is updated to reflect that the server 3 is dead. For example, the server corresponding to server 3 in server 's entry is replaced with server 4. Also, the server corresponding to server 3 in server 4's entry is replaced with server 1. At step 620, server 3 is deleted from the server table resulting in a server table illustrated below in Table 4.

TABLE 4

| Server ID | Buddy A | Buddy B |
| --- | --- | --- |
| server 1 | server 2 | server 4 |
| server 2 | server 4 | server 1 |
| server 4 | server 2 | server 1 |

At step 625, the discovering server (server 4) receives the identity (1, 4) of who server 3's buddies were. Server 4 verifies that it is in the list. Server 4 then notifies server 1 that the server 3 has been removed from the virtual server ring using the ServerReplace function with arguments (ServertoReplace=3, ReplacementServer=4). ServertoReplace will always be the dead server and replacement server will always be the discovering server. The method then ends at step 699.

Normal Server Shutdown

In another aspect of the present invention, when a server shuts down normally, the server should remove itself from the server table (by calling the ServerDelete function described above in reference to FIG. 6) to notify its buddies. Thus, if a server shuts down normally, it is responsible for removing itself from the virtual server ring. This is done by calling the ServerDelete function (FIG. 6) and calling the ServerReplace function (FIG. 5) on each of its buddies replacing itself with the other buddy.

For example, referring to Table 4 above, if server 2 were to shut down, it would first call the ServerDelete function itself and then call Server 4's ServerReplace function with arguments (ServertoReplace=2, Replacement Server=1) and server 1's ServerReplace function with arguments (Servertoreplace=2, ReplacementServer=4).

Conclusion

It should be understood from the description above that the present invention is an infinitely scalable algorithm to implement the detection of "dead"servers in a server pool. For example, the present invention may function with up to "n" servers. For example, the server table for a virtual server ring of "n"servers may be illustrated as in Table 5 below.

TABLE 5

| Server ID | Buddy A | Buddy B |
|---|---|---|
| server 1 | server 2 | server n |
| server 2 | server 3 | server 1 |
| server 3 | server 4 | server 2 |
| ... | ... | ... |
| server n | server (n-1) | server 1 |

Servers in the pool arrange themselves in a virtual server ring, with each server being responsible for looking after its two buddies in the ring. When a new server is started, it inserts itself into the ring and becomes responsible for looking after its two new buddies and the buddies each take on responsibility for looking after the new server. The new server's buddies were previously responsible for each other but that responsibility is shifted to the new server, and so any server at any one time is never responsible for more than two buddy servers.

The only centralized data storage location is a server table located on a machine outside of the server pool. The database is the only entity that knows the current structure of the server ring. The servers themselves only always know who their two buddy servers are in their buddy list. The only times when servers in the pool interact with the server table is when they are started and wish to insert themselves into the ring, when they are shut down and need to remove themselves from the ring, or when they detect that a buddy server is not responding and need to remove the buddy from the ring.

The other clients of this invention are would-be clients of the servers in the server pool. Any client wishing to use one of the server pool servers requests an address of an available server from the server table. Only "live"servers will be present in the server table, so this guarantees that would-be clients will have access to a functional server at any time.

It should be understood that the present invention allows for the creation of infinite server pools. The ability to provide scalability of this magnitude is increasingly important as services requiring server pools continue to become more prevalent.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A system for removing a defective server from a server pool comprising:

a first server associated with a first buddy server and a second buddy server, the first server being operative to transmit a first ping signal to the first buddy server and to transmit a second ping signal to the second buddy server and to receive a first responsive signal from the first buddy server and to receive a second responsive signal from the second buddy server;

a server database operative to maintain the association between the first server and the first buddy server and to maintain the association between the first server and the second buddy server;

wherein the first server is further operative to send a first buddy server down signal to the server database, in response to a determination that the first buddy server is down; and wherein the server database is further operative to associate the first server with a third buddy server in response to the receipt of the first buddy server down signal.

2. The system recited in claim 1, wherein the first server is further operative to send a second buddy server down signal to the server database, in response to a determination that the second buddy server is down and wherein the server database is further operative to associate the first server with a fourth buddy server is response to the receipt of the second buddy server down signal.

3. The system recited in claim 1, wherein the first ping signal comprises an ICMP ping signal and wherein the second ping signal comprises an ICMP ping signal.

4. The system recited in claim 1, wherein the server database comprises a SQL database maintained on a SQL server.

5. The system recited in claim 1, wherein the server database maintain a list of active servers comprising the first server, the first buddy server and the server, and wherein, in response to the first buddy server down signal, the server database is further operative to remove the first buddy server from the list of active servers.

6. The system recited in claim 5, further comprising a client connected to the server database and wherein the list of active servers is used to connect the client to one of the servers in the list of active servers.

* * * * *